(12) United States Patent
Ingle et al.

(10) Patent No.: US 9,268,571 B2
(45) Date of Patent: Feb. 23, 2016

(54) SELECTIVE COUPLING OF AN ADDRESS LINE TO AN ELEMENT BANK OF A VECTOR REGISTER FILE

(71) Applicant: QUALCOMM Incorporated, San Diego, CA (US)

(72) Inventors: Ajay Anant Ingle, Austin, TX (US); Marc M. Hoffman, Mansfield, MA (US); Deepak Mathew, Mansfield, MA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 13/654,730

(22) Filed: Oct. 18, 2012

(65) Prior Publication Data

US 2014/0115227 A1    Apr. 24, 2014

(51) Int. Cl.
G06F 12/00    (2006.01)
G06F 9/30    (2006.01)

(52) U.S. Cl.
CPC .......... *G06F 9/30141* (2013.01); *G06F 9/3012* (2013.01); *G06F 9/30018* (2013.01); *G06F 9/30036* (2013.01); *G06F 9/30043* (2013.01); *G06F 9/30109* (2013.01)

(58) Field of Classification Search
CPC ............ G06F 9/30141; G06F 9/30098; G06F 9/3012; G06F 9/30018; G06F 9/30036; G06F 9/30109; G06F 9/30043
See application file for complete search history.

(56) References Cited

U.S. PATENT DOCUMENTS

| 5,115,393 | A | | 5/1992 | Kashiyama et al. | |
|---|---|---|---|---|---|
| 5,539,902 | A | * | 7/1996 | Sakai et al. | 711/167 |
| 5,678,058 | A | * | 10/1997 | Sato | 712/5 |
| 5,768,559 | A | * | 6/1998 | Iino et al. | 711/157 |
| 5,832,290 | A | * | 11/1998 | Gostin et al. | 712/5 |
| 5,922,066 | A | * | 7/1999 | Cho et al. | 712/204 |
| 6,219,756 | B1 | | 4/2001 | Kasamizugami | |
| 7,284,113 | B2 | * | 10/2007 | Prokopenko et al. | 712/7 |
| 7,467,288 | B2 | * | 12/2008 | Glossner et al. | 712/5 |
| 7,750,915 | B1 | | 7/2010 | Acocella et al. | |
| 7,937,559 | B1 | | 5/2011 | Parameswar et al. | |
| 8,108,652 | B1 | * | 1/2012 | Hui | 712/4 |
| 8,135,897 | B2 | | 3/2012 | Van Berkel | |
| 2002/0026570 | A1 | | 2/2002 | Shimizu et al. | |
| 2005/0198473 | A1 | * | 9/2005 | Ford | 712/221 |

(Continued)

FOREIGN PATENT DOCUMENTS

WO    8902130 A1    3/1989

OTHER PUBLICATIONS

C. Lemuet, J. Sampson, J. Collard, "The Potential Energy Efficiency of Vector Acceleration" SC2006 Nov. 2006, Tampa, Florida, USA.*

(Continued)

*Primary Examiner* — Kevin Verbrugge
*Assistant Examiner* — Francisco Grullon
(74) *Attorney, Agent, or Firm* — Peter Michael Kamarchik; Paul Holdaway

(57) ABSTRACT

A method includes selectively coupling a first address line of a plurality of address lines and a second address line of the plurality of address lines to a first element bank of a plurality of element banks of a vector register file according to a selection pattern. The method also includes accessing data stored within the first element bank that is selectively addressed by the first address line via a single read port.

33 Claims, 7 Drawing Sheets

(56) References Cited

U.S. PATENT DOCUMENTS

2006/0259737 A1* 11/2006 Sachs et al. .................. 712/5
2008/0059759 A1* 3/2008 Sachs .............................. 712/4
2008/0291208 A1 11/2008 Keall
2010/0106944 A1* 4/2010 Symes et al. ................ 712/208
2011/0087859 A1* 4/2011 Mimar ............................ 712/4
2011/0320765 A1 12/2011 Karkhanis et al.
2012/0110037 A1 5/2012 Dockser

OTHER PUBLICATIONS

International Search Report and Written Opinion—PCT/US2013/064063—ISA/EPO—Jan. 24, 2014.

* cited by examiner

SELECTIVE COUPLING OF AN ADDRESS LINE TO AN ELEMENT BANK OF A VECTOR REGISTER FILE

I. FIELD

The present disclosure relates to vector register files.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

A vector register file (VRF) may be used as a storage mechanism in vector processing. A VRF may hold N elements (e.g., vector registers). A single VRF may be connected to a read/write port for read/write operations on the elements of the VRF. Elements of a VRF may be arranged in a grid pattern defined by rows and columns. Each row of elements may be connected to an address line that controls which particular row may be read out to a read port or updated by a write port. A read port or a write port may have access to one row at a time (across all columns, the row determined by the address line).

In existing VRF implementations, when data in different rows is targeted by a read operation or a write operation, each of the rows may be sequentially accessed by the read port or the write port. For example, consider a first element of a VRF that stores Data A and the first half of Data B, and a second element of the VRF that stores the second half of Data B and Data C. Data A and the first half of Data B are stored in a first row, but in different columns. The second half of Data B and Data C are stored in a second row, but in different columns. In existing VRF implementations, the entirety of the first and second elements are accessed when reading or writing Data B (i.e., both the first and the second rows are accessed). Accessing elements not required for a read or write operation (e.g., Data A or Data C) consumes additional power, thus reducing power efficiency of the VRF. Alternatively, multiple read ports or write ports may be used. While each read port or write port may access a different row, power consumption and component cost increase as the number of read ports or write ports is increased.

III. SUMMARY

Accessing elements not required for a read or write operation or utilizing multiple read ports or write ports to access elements for the read or write operation may reduce power efficiency of a VRF. The systems and methods described herein may advantageously enable a single read port or write port to access required elements in a VRF for a read or write operation without accessing elements that are not required. The use of a single read port or write port to access data in different elements of the VRF may reduce power consumption of the VRF and component cost.

For example, a vector register file (VRF) having a plurality of element banks may be connected to a single read port and to a single write port. Each of the plurality of element banks may be selectively coupled to a plurality of address lines via a respective multiplexor. A selection pattern may be used to determine the selective coupling of each of the plurality of element banks to the plurality of address lines, so that the single read port or write port may access elements specified by a read or write operation.

In a particular embodiment, an apparatus includes a vector register file including a plurality of element banks. The apparatus also includes a plurality of address lines selectively coupled to each of the plurality of element banks and a single read port configured to access data stored within each of the element banks that is selectively addressed by one of the plurality of address lines. At least a first of the plurality of the element banks is selectively coupled to a first of the plurality of address lines.

In another particular embodiment, a method includes selectively coupling a first address line of a plurality of address lines and a second address line of the plurality of address lines to a first element bank of a plurality of element banks of a vector register file according to a selection pattern. The method also includes accessing data stored within the first element bank that is selectively addressed by the first address line via a single read port.

In another particular embodiment, an apparatus includes a vector register file including a plurality of element banks. The apparatus also includes a plurality of address lines selectively coupled to each of the plurality of element banks. The apparatus further includes a single write port configured to store data within each of the plurality of element banks that is selectively addressed by one of the plurality of address lines. At least one of the plurality of element banks is selectively coupled to a first of the plurality of address lines.

In another particular embodiment, a method includes selectively coupling a first address line of a plurality of address lines and a second address line of the plurality of address lines to a first element bank of a plurality of element banks of a vector register file according to a selection pattern. The method also includes storing data within the first element bank that is selectively addressed by the first address line via a single write port.

In another particular embodiment, an apparatus includes means for storing vector data, the means for storing includes a plurality of element banks. The apparatus also includes means for selectively coupling a plurality of address lines to each of the plurality of element banks of the means for storing. The apparatus further includes means for accessing, via a single read port, data stored within each of the element banks that is selectively addressed by one of the plurality of address lines. At least a first of the element banks is selectively coupled to a first of the plurality of address lines and a second of the plurality of element banks is selectively coupled to a second of the plurality of address lines.

In another particular embodiment, a non-transitory computer readable medium includes processor executable instructions to cause a processor to generate a selection pattern to selectively couple a plurality of address lines to each of a plurality of element banks of a vector register file. The non-transitory computer readable medium also includes processor executable instructions to cause the processor to access data stored within each of the element banks that is selectively addressed by one of the plurality of address lines via a single read port. At least one of the element banks is selectively coupled to a first of the plurality of address lines and a second of the plurality of element banks is selectively coupled to a second of the plurality of address lines.

In another particular embodiment, an apparatus includes means for storing vector data, the means for storing includes a plurality of element banks. The apparatus also includes means for selectively coupling a plurality of address lines to each of the plurality of element banks of the means for storing. The apparatus further includes means for writing, via a single write port, data within each of the plurality of element banks that is selectively addressed by one of the plurality of address lines. At least a first of the plurality of element banks is selectively coupled to a first of the plurality of address lines and a second of the plurality of element banks is selectively coupled to a second of the plurality of address lines.

In another particular embodiment, a non-transitory computer readable medium includes processor executable instructions to cause a processor to generate a selection pattern to selectively couple a plurality of address lines to each of a plurality of element banks of a vector register file. The non-transitory computer readable medium also includes processor executable instructions to cause the processor to store data within each of the plurality of element banks that is selectively addressed by one of the plurality of address lines via a single write port. At least a first of the plurality of element banks is selectively coupled to a first of the plurality of address lines and a second of the plurality of element banks is selectively coupled to a second of the plurality of address lines.

One particular advantage provided by at least one of the disclosed embodiments is an ability of a single device (e.g., a read port or a write port) to access multiple different elements of a VRF during an operation (e.g., a read operation or a write operation), which may provide enhanced power efficiency (e.g., reduced power consumption by the VRF) as compared to using multiple read or write ports.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
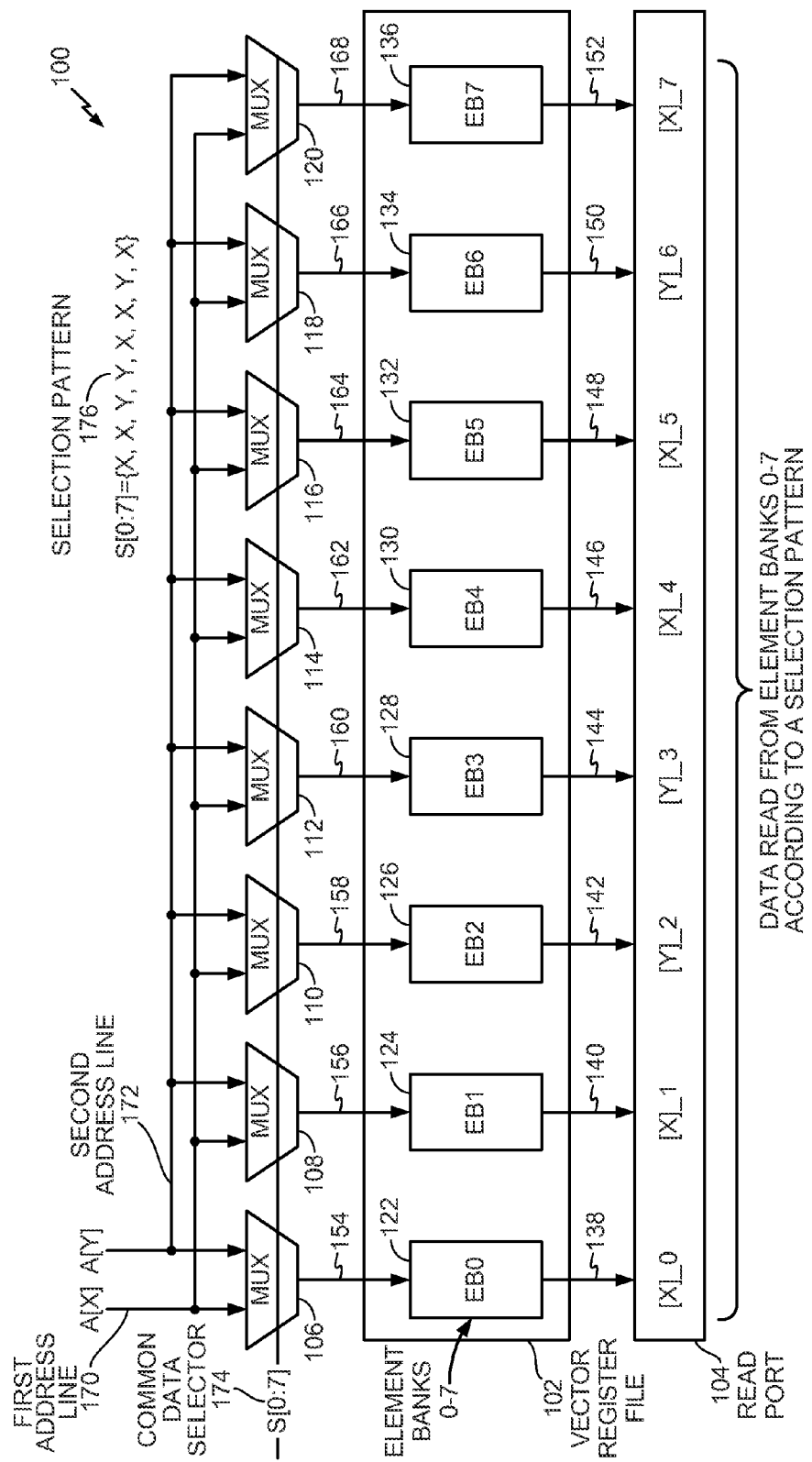
FIG. 1 is a diagram to illustrate a particular embodiment of a system operable to enable a single read port to access different elements of a vector register file.

FIG. 1 is a diagram to illustrate a particular embodiment of a system 100 that is operable to enable a single read port to access different elements of a vector register file. The system 100 may include a vector register file (VRF) 102, a read port 104, and multiplexers (MUXs) 106, 108, 110, 112, 114, 116, 118, and 120. The VRF 102 may include element banks 122, 124, 126, 128, 130, 132, 134, and 136. The read port 104 may be configured to access data stored in the element banks 122-136 and to retain the accessed data for use by other entities (e.g., a vector arithmetic module). The read port 104 may be coupled to the element banks 122-136 via a corresponding read data line 138, 140, 142, 144, 146, 148, 150, and 152 respectively. Each read data line 138-152 may include multiple bits (e.g., each read data line may be 32-bits).

The MUXs 106-120 may be respectively coupled to the element banks 122-136 via connections 154, 156, 158, 160, 162, 164, 166, and 168 respectively. Each MLA 106-120 may be coupled to a plurality of address lines, such as a first address line 170 (designated A[X]) and a second address line 172 (designated/A[Y]). The MUXs 106-120 may be integrated with the VRF 102, the read port 104, or a combination thereof. In a particular embodiment, each MUX 106-120 is a 2-to-1 (two inputs and one output) MUX. A first input and a second input of each MUX 106-120 may be connected to the first address line 170 and the second address line 172, respectively. An output of each WA 106-120 may be coupled to a corresponding element bank 122-136 via the connections 154-168, as shown. A common data selector 174 may be connected to a selector port of each MUX 106-120 to selectively couple the first input or the second input to the output of the MUX.

Each element bank 122-136 may have a plurality of elements. In a particular embodiment, each element bank 122-136 has thirty-two elements (e.g., thirty-two entries or rows). The element banks 122-136 may be arranged within the VRF 102 according to a grid pattern, so that the element banks 122-136 may represent multiple columns (e.g., eight columns). Each element bank 122-136 may implement the same addressing scheme to address each element with a particular element bank and may be configured to store data. Each element bank 122-136 may be a vector register with a particular register name and may be accessible by instructions that reference the particular vector register (e.g., by name). In a particular embodiment, each element of the element banks 122-136 is a random access memory (RAM) structure having address decoders for single-instruction-multiple-data (SIMD) processing.

During a read operation, the common data selector 174 may receive a selection pattern 176 that may include a plurality of values (e.g., bits). Each value may correspond to an address of an element in a particular element bank required for the read operation. The selection pattern 176 may be part of an instruction generated by a processor. In FIG. 1, the selection pattern 176 is {X, X, Y, Y, X, X, Y, X} and corresponds to an element located at an address X in the element bank 122 (e.g., an element located at row X of the element bank 122), an element located at the address X in the element bank 124, an element located at an address Y in the element bank 126, an element located at the address Y in the element bank 128, an element located at the address X in the element bank 130, an element located at the address X in the element bank 132, an element located at the address Y in the element bank 134, and an element located at the address X in the element bank 136. The first address line 170 and the second address line 172 may contain the address X and the address Y, respectively. In a particular embodiment, the address Y is calculated as a function of the address X or vice versa.

Each MUX 106-120 may selectively couple the first address line 170 or the second address line 172 to each element bank 122-136 according to the selection pattern 176 received at the common data selector 174. Based on the selective coupling, the first address line 170 (which contains the address X) or the second address line 172 (which contains the address Y) may enable a particular element located at the address X or Y each element bank 122-136 to be respectively selected via the connections 154-168 and enable data stored within the particular element to be read out to the single read port 104 via the read data lines 138-152. Based on the value of the selection pattern 176, some of the element banks 122-136 may be coupled to a common address line (e.g., the element bank 122 and the element bank 124 are both coupled to the first address line 170), while some other element banks of the element banks 122-136 may be coupled to different address lines (e.g., the element bank 122 is coupled to the first address line 170 and the element bank 126 is coupled to the second address line 172).

Although FIG. 1 illustrates two address lines, it should be understood at any number of address lines may be used and different size MUXs or other selection mechanisms may be used to accommodate the number of address lines. Although FIG. 1 illustrates eight element banks in the VRF 102, in other embodiments, the VRF 102 may have more or fewer element banks. Alternatively, or in addition, the VRF 102 may be connected to a single write port, as is further described with reference to FIG. 2.

The system 100 may thus enable a single device (e.g., the read port 104) to concurrently access different elements (e.g., different rows) of a VRF during a read operation, which may reduce power consumption of the VRF.

Figure 2:
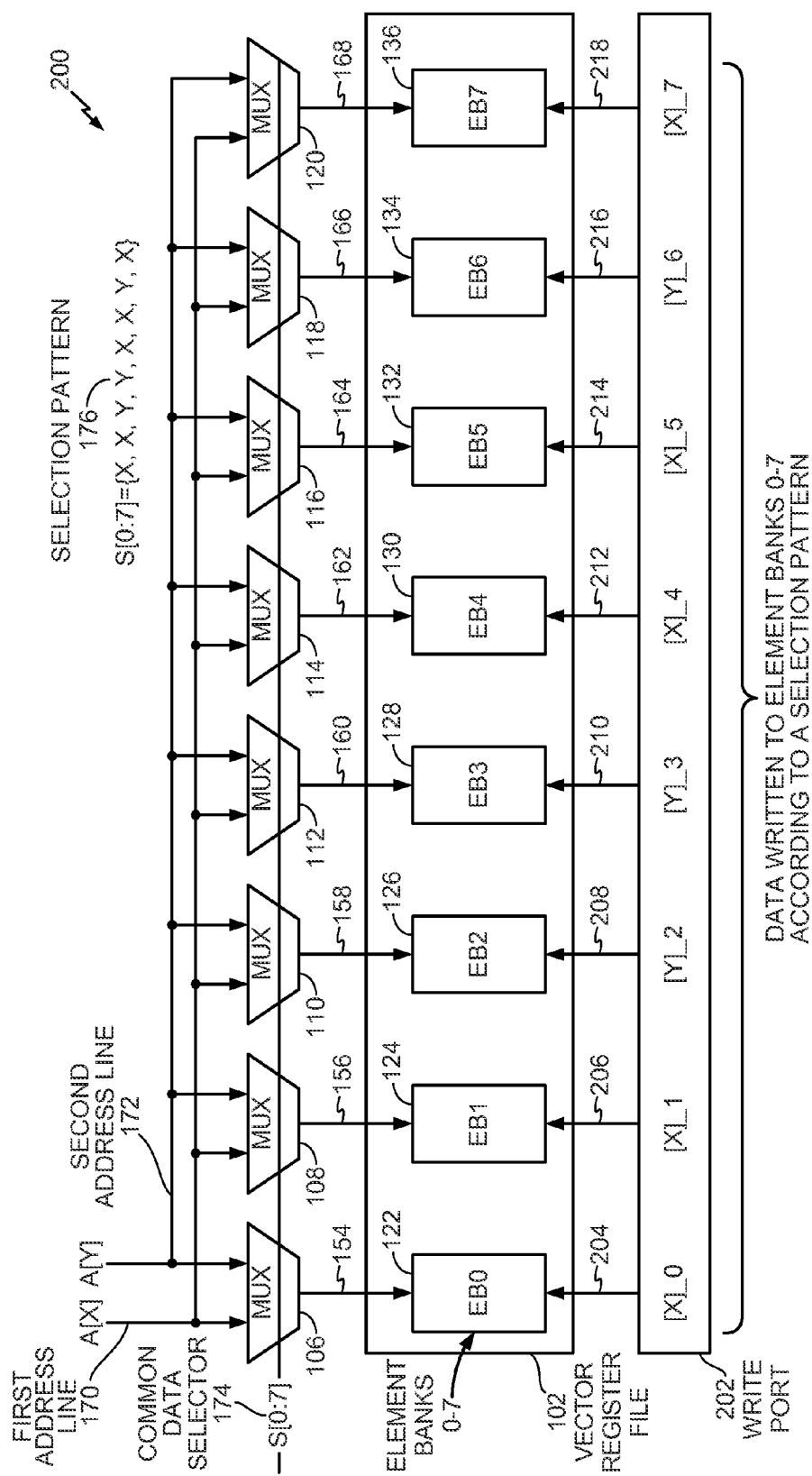
FIG. 2 is a diagram to illustrate a particular embodiment of a system operable to enable a single write port to access different elements of a vector register file.

FIG. 2 is a diagram to illustrate a particular embodiment of a system that is operable to enable a single write port to access different elements of a vector register file and is generally designated 200. As shown in FIG. 2, the VRF 102 may be connected to a write port 202. The write port 202 may be configured to store data in elements of the element banks 122-136 via write data lines 204, 206, 208, 210, 212, 214, 216, and 218 respectively. The write port 202 may receive data to be stored in elements of the element banks 122-136 from a data source (e.g., an instruction unit).

During a write operation, the common data selector 174 may receive the selection pattern 176. Each MUX 106-120 may selectively couple the first address line 170 or the second address line 172 to each element bank 122-136 according to the selection pattern 176. Based on the selective coupling, the first address line 170 (which contains the address X) or the second address line 172 (which contains the address Y) may enable a particular element located at the address X or Y in each element bank 122-136 to be respectively selected via the connections 154-168 and may enable the write port 202 to respectively store data in the particular selected element.

The system 200 may thus enable a single device (e.g., the write port 202) to concurrently provide write access to different elements (e.g., different rows) of a VRF during a write operation, which may reduce power consumption of the VRF.

Figure 3:
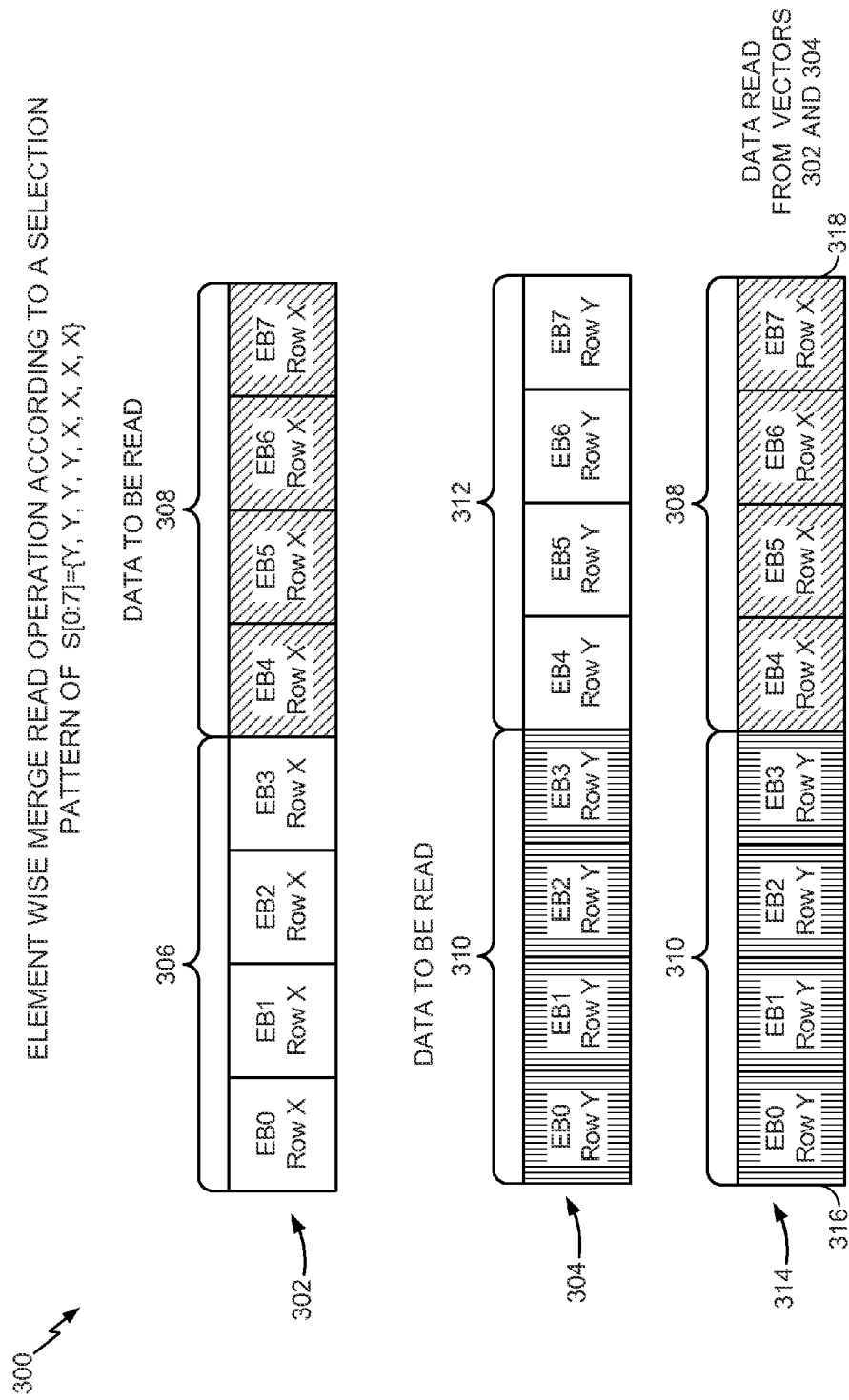
FIG. 3 is a diagram to illustrate a particular embodiment of an element wise merge read operation in the vector register file of FIG. 1.

FIG. 3 is a diagram to illustrate a particular embodiment of an element wise merge read operation in the VRF 102 of FIG. 1 and is generally designated 300. The element wise merge read operation may be performed on a vector 302 and a vector 304. Each of the vectors 302 and 304 may include a respective element located at a particular address across the element banks 122-136 of FIG. 1.

The vector 302 may have a first sub-vector 306 and a second sub-vector 308. The first sub-vector 306 may correspond to elements respectively located at the address X from the element banks 122, 124, 126, and 128 of FIG. 1. The second sub-vector 308 may correspond to elements respectively located at the address X from the element banks 130, 132, 134, and 136 of FIG. 1. The vector 304 may have a third sub-vector 310 and a fourth sub-vector 312. The third sub-vector 310 may correspond to elements respectively located at the address Y from the element banks 122, 124, 126, and 128. The fourth sub-vector 312 may correspond to elements respectively located at the address Y from the element banks 130, 132, 134, and 136.

The element wise merge read operation may specify the second sub-vector 308 and the third sub-vector 310. For example, the second sub-vector 308 and the third sub-vector 310 may collectively represent a desired data item (e.g., a word, a half-word, or a byte). A selection pattern a selection pattern of {Y, Y, Y, Y, X, X, X, X}) corresponding to the addresses of elements required may be input through the a common data selector (e.g., the common data selector 174 of FIG. 1) to enable a read port (e.g., the read port 104 of FIG. 1) to read data stored in the specified elements from the vector 302 and the vector 304. The first sub-vector 306 and the fourth sub-vector 312 may not be accessed by the read port during the element wise merge read operation. Data stored in the specified elements may be stored (in the read port) as a vector 314. For example, a first element 316 of the vector 314 may correspond to data stored in the element located at address Y of the element bank 120 of FIG. 1 and a second element 318 of the vector 314 may correspond to data stored in the element located at address X of the element bank 136 of FIG. 1.

At the end of the read operation, the first element 316 may be positioned as a first element of the vector 314 and the second element 318 may be positioned as a last element of the vector 314, as shown. The order of elements in the vector 314 may be manipulated (e.g., by the read port 104, by a processor according to an instruction, etc.) so that the elements in the vector 314 may be accessed sequentially in a particular order. For example, if Row X and Row Y are adjacent, the sub-vectors 308 and 310 may represent a condition in which a word wraps to the next row. After the read operation, the order of the sub-vectors 308 and 310 may be reversed so as to represent the wrapped word read from the VRF 102.

Figure 4:
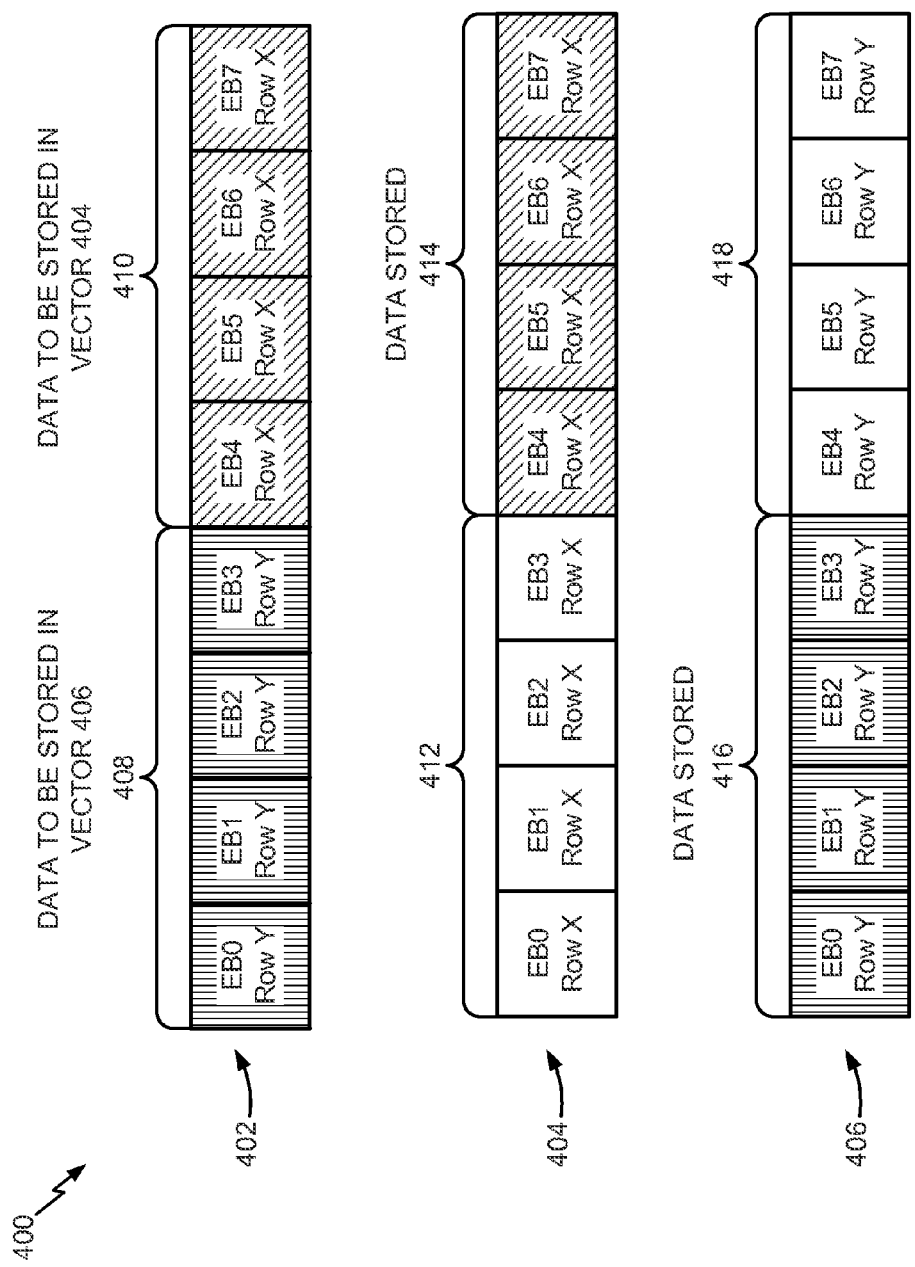
FIG. 4 is a diagram to illustrate a particular embodiment of an element wise split write operation in the vector register file of FIG. 1.

FIG. 4 is a diagram to illustrate a particular embodiment of an element wise split write operation in the vector register file 102 of FIG. 1 and is generally designated 400. During the element wise split write operation, a vector 402 may have data that is to be stored in a vector 404 and a vector 406 of a VRF. In a particular embodiment, the vector 402 has a first sub-vector 408 that includes data to be stored in the vector 406. Additionally, the vector 402 has a second sub-vector 410 that includes data to be stored in the vector 404. The first sub-vector 408 may correspond to data to be stored in elements respectively located at the address Y of the element banks 122-128. The second sub-vector 410 may correspond to data to be stored in elements respectively located at the address X of the element banks 130-136.

The vector 404 may have a third sub-vector 412 corresponding to elements respectively located at the address X of the element banks 122-128 of FIG. 1 and a fourth sub-vector 414 corresponding to elements respectively located at the address X of the element banks 130-136 of FIG. 1. The vector 406 may have a fifth sub-vector 416 corresponding to elements respectively located at the address Y of the element banks 122-128 of FIG. 1 and a sixth sub-vector 418 corresponding to elements respectively located at the address Y of the element banks 130-136 of FIG. 1.

A selection pattern (e.g., a selection pattern of {Y, Y, Y, Y, X, X, X, X}) corresponding to the addresses of elements specified by the split write operation may be input through a common data selector (e.g., the common data selector 174) to enable a write port (e.g., the write port 202 of FIG. 2) to store data in the specified elements of the vector 404 and the vector 406. After the element wise split write operation, data from the first sub-vector 408 may be stored in the fifth sub-vector 416 and data from the second sub-vector 410 may be stored in the fourth sub-vector 414. The write port may not store data in or access the third sub-vector 412 and the sixth sub-vector 418. In a particular embodiment, a write port (e.g., the write port 202 of FIG. 2) stores data from the first sub-vector 408 in the fourth sub-vector 414 and data from the second sub-vector 410 in the fifth sub-vector 416 according to a particular selection pattern (e.g., such that the order of the data in the first sub-vector 408 and the data in the second sub-vector 410 is maintained).

The element wise merge read operation of FIG. 3 and the element wise spilt write operation of FIG. 4 may be completed during a single instruction. In a particular embodiment, the VRF 102 of FIG. 1 is integrated in a processor, where the processor, during the single instruction, is configured to instruct the read port 104 to access (and store) data for the element wise merge read operation as read data, to modify the data, and to instruct the write port 202 to update the VRF 102 with the modified data (e.g., by storing the modified data in the VRF 102).

Figure 5:
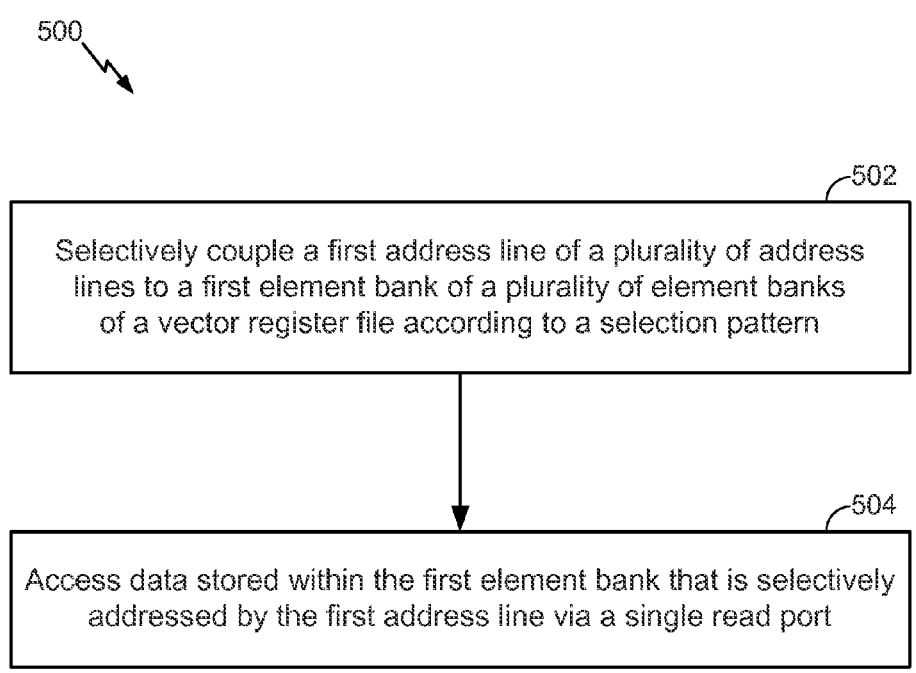
FIG. 5 is flowchart to illustrate a particular embodiment of a method of operation at the system of FIG. 1.

FIG. 5 is flowchart to illustrate a particular embodiment of a method 500 of operation at the system 100 of FIG. 1. The method 500 may include selectively coupling a first address line of a plurality of address lines to a first element bank of a plurality of element banks of a vector register file according to a selection pattern, at 502. For example, in FIG. 1, the MUXs 106-120 may selectively couple the first address line 170 to the element banks 122, 124, 130, 132, and 136 according to the selection pattern 176. The method 500 may also include accessing data stored within the first element bank that is selectively addressed by the first address line via a single read port, at 504. For example, FIG. 1, the read port 104 may access data stored in the particular element located at the address X or Y of each element bank 122-136 according to the selection pattern 176.

Figure 6:
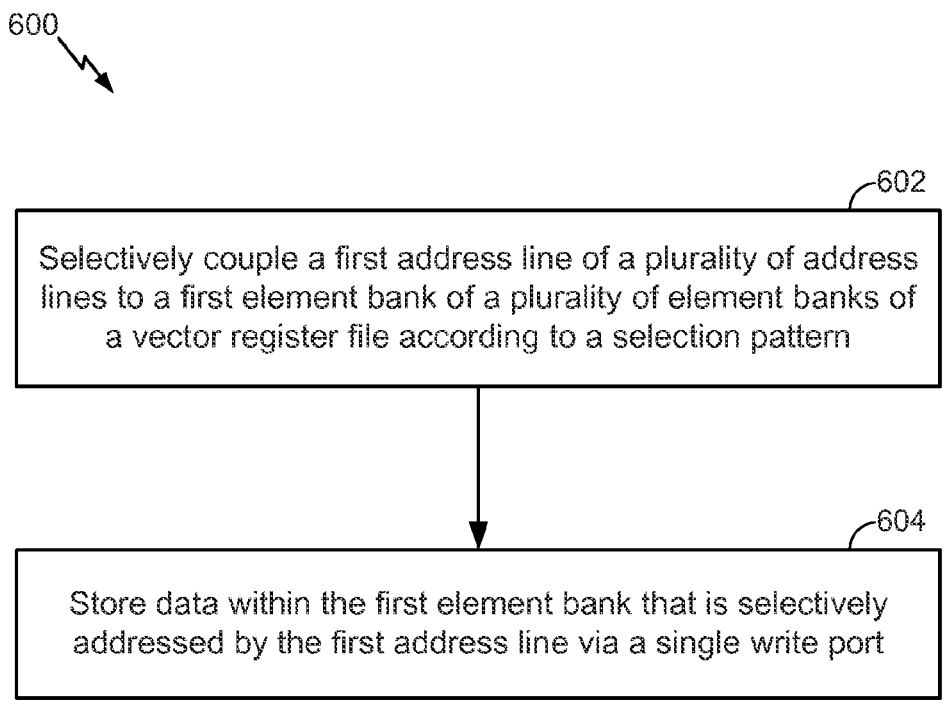
FIG. 6 is flowchart to illustrate a particular embodiment of a method of operation at system of FIG. 2.

FIG. 6 is flowchart to illustrate a particular embodiment of a method 600 of operation at the system 200 of FIG. 2. The method 600 may include selectively coupling a first address line of a plurality of address lines to a first element bank of a plurality of element banks of a vector register file according to a selection pattern, at 602. For example, in FIG. 2, the MUXs 106-120 may selectively couple the first address line 170 to the element banks 122, 124, 130, 132, and 136 according to the selection pattern 176. The method 600 may also include storing data within the first element bank that is selectively addressed by the first address line via a single write port, at 604. For example, in FIG. 2, the write port 202 may store data in the particular element located at the address X or Y of each element bank 122-136 according to the selection pattern 176.

Figure 7:
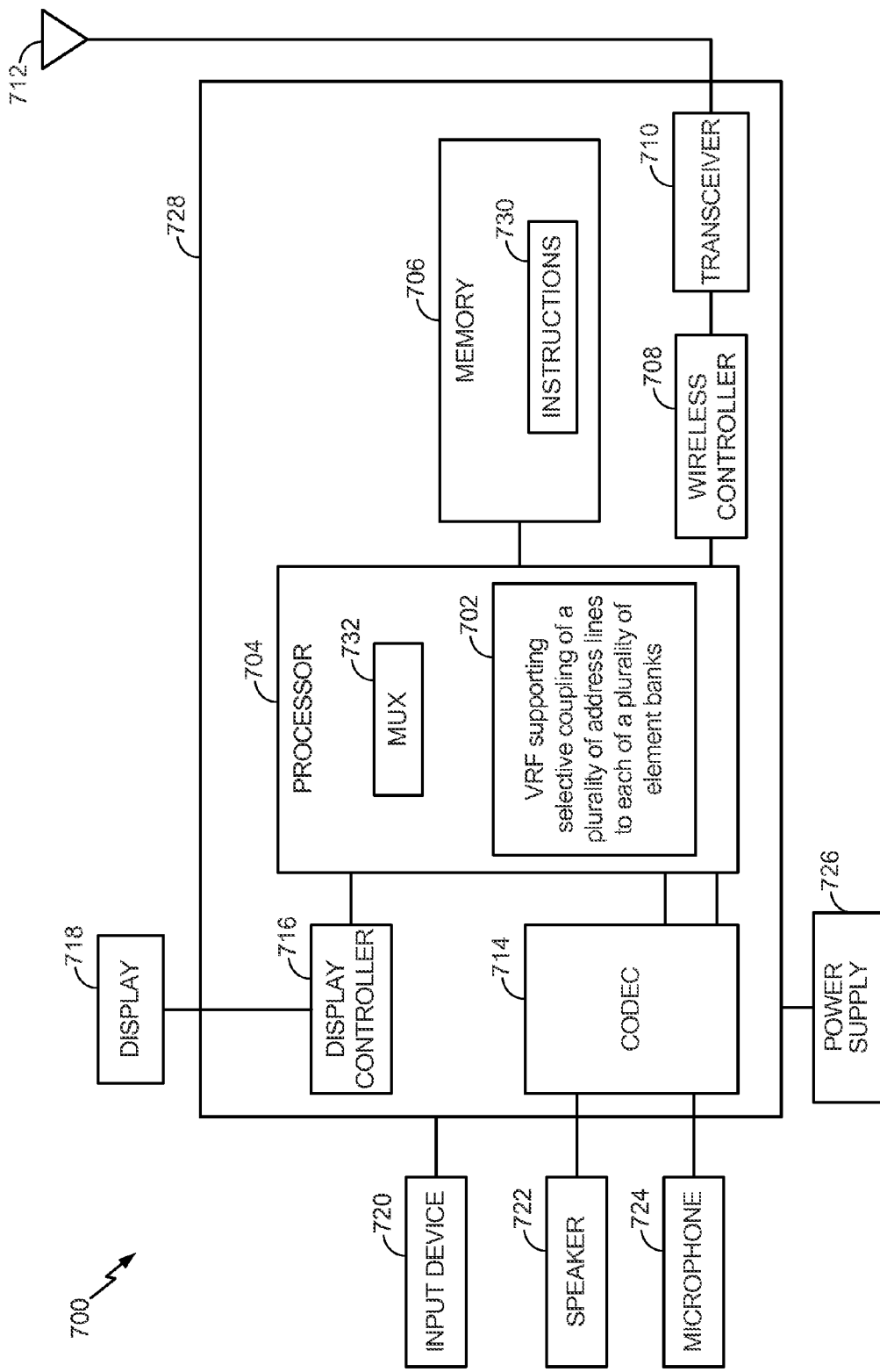
FIG. 7 is a block diagram of a communication device including components that are operable to enable a single read port and/or a single write port to access different elements of a vector register file.

FIG. 7 is a block diagram of a communication device 700 including components that are operable to enable accessing different elements of a vector register file in accordance with the described teachings. Further, all or part of the methods described in FIGS. 5 and 6 may be performed at or by the communication device 700. The communication device 700 may include a processor 704 (e.g., a digital signal processor (DSP) or a central processing unit (CPU)) coupled to a memory 706. The processor 704 may include a VRF 702 that may support selectively coupling a plurality of address lines to each of a plurality of element banks of the VRF 702. The processor 704 may also include a MUX 732. The VRF 702 may be the VRF 102 of FIG. 1 and FIG. 2. The VRF 702 may also include the read port 104 of FIG. 1, the write port 202 of FIG. 2, or a combination thereof. The MUX 732 may be the MIAs 106-120 of FIG. 1.

The memory 706 may be a non-transitory tangible computer-readable and/or processor-readable storage device that stores instructions 730. The instructions 730 may be executable by the processor 704 to perform one or more functions or methods described herein, such as the methods described with reference to FIGS. 5 and 6. FIG. 7 shows that the communication device 700 may also include a display controller 716 that is coupled to the processor 704 and to a display 718. A coder/decoder (CODEC) 714 can also be coupled to the processor 704. A speaker 722 and a microphone 724 can be coupled to the CODEC 714. FIG. 7 also indicates that a wireless controller 708 may be coupled to the processor 704, where the wireless controller 708 is in communication with an antenna 712 via a transceiver 710. The wireless controller 708, the transceiver 710, and the antenna 712 may thus represent a wireless interface that enables wireless communication by the communication device 700. The communication device 700 may include numerous wireless interfaces, where different wireless networks are configured to support different networking technologies or combinations of networking technologies. For example, the communication device 700 may include an IEEE 802.11 wireless interface.

In a particular embodiment, the processor 704, the display controller 716, the memory 706, the CODEC 714, the wireless controller 708, and the transceiver 710 are included in a system-in-package or system-on-chip device 728. In a particular embodiment, an input device 720 and a power supply 726 are coupled to the system-on-chip device 728. Moreover, in a particular embodiment, as illustrated in FIG. 7, the display device 718, the input device 720, the speaker 722, the microphone 724, the antenna 712, and the power supply 726 are external to the system-on-chip device 728. However, each of the display device 718, the input device 720, the speaker 722, the microphone 724, the antenna 712, and the power supply 726 can be coupled to a component of the system-on-chip device 728, such as an interface or a controller.

In conjunction with the described embodiments, an apparatus may include means for storing vector data, the means for storing including a plurality of element banks. For example, the means for storing may include the VRF 102 of FIG. 1, the element banks 122-136 of FIG. 1, the VRF 702 of FIG. 7, one or more other devices configured to store vector data, or a combination thereof. The apparatus may also include means for selectively coupling a plurality of address lines to each of a plurality of element banks of the means for storing. For example, the means for selectively coupling may include the MUXs 106-120, the common data selector 174 of FIG. 1, the MUX 732 of FIG. 7, one or more devices configured to selectively couple a plurality of address lines to an element bank of a VRF, or a combination thereof. The apparatus may also include means for accessing, via a single read port, data stored within each of the element banks that is selectively addressed by one of the plurality of address lines, where at least a first of the element banks is selectively coupled to a first of the plurality of address lines and a second of the element banks is selectively coupled to a second of the plurality of address lines. For example, the means for accessing may include one or more of the read data lines 138-152 of FIG. 1, one or more devices configured to access data via a single read port, or a combination thereof.

Another apparatus may include means for storing vector data, the means for storing including a plurality of element banks. For example, the means for storing may include the VRF 102, the element banks 122-136 of FIG. 1, the VRF 702 of FIG. 7, one or more other devices configured to store vector data, or a combination thereof. The apparatus may also include means for selectively coupling a plurality of address lines to each of a plurality of element banks of the means for storing. For example, the means for selectively coupling may include the MUXs 106-120 of FIG. 1, the common data selector 174 of FIG. 1, the MUX 732 of FIG. 7, one or more devices configured to selectively couple a plurality of address lines to an element bank of a VRF, or a combination thereof. The apparatus may further include means for writing, via a single e port, to store data within each of the plurality of element banks that is selectively addressed by one of the plurality of address lines, where at least a first of the plurality of element banks is selectively coupled to a first of the plurality of address lines and a second of the plurality of element banks is selectively coupled to a second of the plurality of address lines. For example, the means for writing may include one or more of the write data lines 204-218 of FIG. 2, one or more devices configured to store data via a single write port, or a combination thereof.

One or more of the disclosed embodiments may be implemented in a system or an apparatus that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-7 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated in the FIGS. 1-7 may be performed by corresponding functional means capable of performing the operations. Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of a computer program from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer program product for performing the operations presented herein. For example, such a computer program product may include a computer-readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD)). Moreover, any other suitable technique for providing the methods and techniques described herein can be utilized.

It is to be understood that the claims are not limited to the precise configuration and components illustrated above. The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. An apparatus comprising:
    a vector register file including a plurality of hardware element banks;
    a plurality of sets of address lines, each set of address lines of the plurality of sets of address lines including:
        a first address line configured to receive a first address, and
        a second address line configured to receive a second address;
    a plurality of address line selectors, wherein each address line selector of the plurality of address line selectors is coupled to a corresponding set of address lines of the plurality of sets of address lines and is configured to generate an output by selecting the first address line or the second address line of the set of address lines coupled to the address line selector; and
    a single read port configured to access data stored within the plurality of hardware element banks,
    wherein each hardware element bank of the plurality of hardware element banks is configured to be selectively addressed by one of the first address or the second address, and
    wherein a first hardware element bank of the plurality of hardware element banks is configured to be selectively coupled, via a first output of a first address line selector, to a particular first address line of a first set of address lines coupled to the first address line selector.

2. The apparatus of claim 1, wherein the first set of address lines comprises the particular first address line and a particular second address line coupled to the first address line selector, wherein a second set of address lines comprises a third address line coupled to a second address line selector and a fourth address line coupled to the second address line selector, wherein each of the particular first address line and the particular second address line is configured to be selectively coupled, via the first output of the first address line selector, to the first hardware element bank, and wherein each of the third address line and the fourth address line is configured to be selectively coupled, via a second output of the second address line selector, to a second hardware element bank of the plurality of hardware element banks.

3. The apparatus of claim 1, wherein the plurality of address line selectors comprises a plurality of multiplexers, and wherein a number of multiplexers of the plurality of multiplexers corresponds to a number of hardware element banks of the plurality of hardware element banks.

4. The apparatus of claim 3, wherein a particular multiplexer of the plurality of multiplexers is coupled to a particular hardware element bank of the plurality of hardware element banks, wherein a plurality of data lines couple the plurality of hardware element banks to the single read port, and wherein:
    each hardware element bank of the plurality of hardware element banks is coupled to the single read port via a separate data line of the plurality of data lines.

5. The apparatus of claim 1, wherein the first set of address lines includes the particular first address line and a particular second address line, wherein a second set of address lines includes a third address line and a fourth address line, and wherein:
    the first hardware element bank is configured to be selectively addressed by one of the particular first address line or the particular second address line, and
    a second hardware element bank of the plurality of hardware element banks is configured to be selectively addressed by one of the third address line or the fourth address line.

6. The apparatus of claim 1, wherein the plurality of address line selectors comprises a plurality of multiplexers, further comprising a plurality of connections coupling the plurality of hardware element banks to the plurality of multiplexers, wherein the plurality of multiplexers is connected to a common data selector, and wherein:
    the common data selector is configured to receive a selection pattern corresponding to each hardware element bank of the plurality of hardware element banks.

7. The apparatus of claim 1, further comprising a single write port configured to store data within each hardware element bank of the plurality of hardware element banks, wherein the vector register file is integrated in a processor, and wherein the processor, during a single instruction, is configured to:
    instruct the single read port to access the data as read data;
    modify the read data; and
    instruct the single write port to update the vector register file with the modified read data.

8. A method comprising:
    selectively coupling address lines of a plurality of sets of address lines to a plurality of hardware element banks of a vector register file using a plurality of address line selectors, wherein:
        each set of address lines of the plurality of sets of address lines includes:
            a first address line configured to receive a first address, and
            a second address line configured to receive a second address,
        each address line selector of the plurality of address line selectors is coupled to a corresponding set of address lines of the plurality of sets of address lines and is configured to generate an output by selecting the first address line or the second address line of the set of address lines coupled to the address line selector,
        the first address line of a first set of address lines of the plurality of sets of address lines and the second address line of the first set of address lines are selectively coupled to a first hardware element bank of the plurality of hardware element banks,
        the first address line of the first set of address lines and the second address line of the first set of address lines are selectively coupled according to a selection pattern, and
        the vector register file is coupled to a single read port;
    coupling the first address line of the first set of address lines to the first hardware element bank according to a particular selection pattern;
    selectively addressing the first hardware element bank using the first address line of the first set of address lines; and
    accessing data stored within the first hardware element bank via the single read port.

9. The method of claim 8, further comprising:
    coupling the first address line of a second set of address lines of the plurality of sets of address lines to a second hardware element bank of the plurality of hardware element banks according to the selection pattern, wherein the first hardware element bank and the second hardware element bank are coupled to a common address line.

10. The method of claim 8, further comprising:
    coupling the second address line of a second set of address lines of the plurality of sets of address lines to a second hardware element bank of the plurality of hardware element banks according to the selection pattern, wherein the first hardware element bank and the second hardware element bank are coupled to different address lines.

11. An apparatus comprising:
    means for storing vector data, the means for storing vector data coupled to a single read port and including a plurality of hardware element banks;
    means for selectively coupling address lines of a plurality of sets of address lines to the plurality of hardware element banks, each set of address lines of the plurality of sets of address lines including a first address line configured to receive a first address and a second address line configured to receive a second address, the means for selectively coupling including:
        a plurality of address line selectors, wherein each address line selector of the plurality of address line selectors is coupled to a corresponding set of address lines of the plurality of sets of address lines and is configured to generate an output by selecting the first address line or the second address line of the set of address lines coupled to the address line selector; and
    means for accessing, via the single read port, data stored within the plurality of hardware element banks,
    wherein each hardware element bank of the plurality of hardware element banks is configured to be selectively addressed by one of the first address or the second address,
    wherein a first hardware element bank of the plurality of hardware element banks is configured to be selectively coupled, via a first output of a first address line selector, to the first address line of a first set of address lines of the plurality of sets of address lines, the first set of address lines coupled to the first address line selector, and
    wherein a second hardware element bank of the plurality of hardware element banks is configured to be selectively coupled, via a second output of a second address line selector, to the second address line of a second set of address lines of the plurality of sets of address lines, the second set of address lines coupled to the second address line selector.

12. The apparatus of claim 11, wherein the means for selectively coupling is responsive to a selection pattern.

13. A non-transitory computer readable storage medium comprising processor-executable instructions that, when executed by a processor, cause the processor to:
    generate a selection pattern to selectively couple address lines of a plurality of sets of address lines to a plurality of hardware element banks of a vector register file using a plurality of address line selectors, wherein:
        each set of address lines of the plurality of sets of address lines includes:
            a first address line configured to receive a first address, and
            a second address line configured to receive a second address,
        each address line selector of the plurality of address line selectors is coupled to a corresponding set of address lines of the plurality of sets of address lines and is configured to generate an output by selecting the first address line or the second address line of the set of address lines coupled to the address line selector, and
        the vector register file is coupled to a single read port; and
    access data stored within the plurality of hardware element banks, wherein:
        each hardware element bank of the plurality of hardware element banks is configured to be selectively addressed by one of the first address or the second address via the single read port,
        a first hardware element bank of the plurality of hardware element banks is configured to be selectively coupled, via a first output of a first address line selector, to the first address line of a first set of address lines of the plurality of sets of address lines, the first set of address lines coupled to the first address line selector, and
        a second hardware element bank of the plurality of hardware element banks is configured to be selectively coupled, via a second output of a second address line selector, to the second address line of a second set of address lines of the plurality of sets of address lines, the second set of address lines coupled to the second address line selector.

14. The non-transitory computer readable storage medium of claim 13, wherein particular first address lines of the plurality of sets of address lines and particular second address lines of the plurality of sets of address lines are configured to be selectively coupled to the plurality of hardware element banks through respective multiplexers of a plurality of multiplexers.

15. An apparatus comprising:
a vector register file including a plurality of hardware element banks;
a plurality of sets of address lines, each set of address lines of the plurality of sets of address lines including:
a first address line configured to receive a first address, and
a second address line configured to receive a second address;
a plurality of address line selectors, wherein each address line selector of the plurality of address line selectors is coupled to a corresponding set of address lines of the plurality of sets of address lines and is configured to generate an output by selecting the first address line or the second address line of the set of address lines coupled to the address line selector; and
a single write port configured to store data within the plurality of hardware element banks,
wherein each hardware element bank of the plurality of hardware element banks is configured to be selectively addressed by one of the first address or the second address, and
wherein a first hardware element bank of the plurality of hardware element banks is configured to be selectively coupled, via a first output of a first address line selector, to the first address line of a first set of address lines coupled to the first address line selector.

16. The apparatus of claim 15, wherein the vector register file includes a plurality of vector registers, and wherein:
each vector register of the plurality of vector registers is accessible by instructions that reference a respective vector register name.

17. The apparatus of claim 15, wherein two adjacent hardware element banks of the plurality of hardware element banks are selectively coupled to two second address lines of two corresponding sets of address lines of the plurality of sets of address lines.

18. The apparatus of claim 15, further comprising a single read port configured to access data stored within each hardware element bank of the plurality of hardware element banks, wherein the vector register file is integrated in a processor, and wherein the processor, during execution of a single instruction, is configured to:
instruct the single read port to access the data as read data;
modify the read data; and
instruct the single write port to update the vector register file with the modified read data.

19. The apparatus of claim 15, wherein a particular hardware element bank of the plurality of hardware element banks is coupled to a multiplexer of a plurality of multiplexers configured to receive a control to select one of the first address line or the second address line of the first set of address lines, and wherein the particular hardware element bank has a write data line.

20. The apparatus of claim 19, wherein:
the plurality of multiplexers is connected to a common data selector, and
the common data selector is configured to receive a selection pattern corresponding to each hardware element bank of the plurality of hardware element banks.

21. A method comprising:
selectively coupling address lines of a plurality of sets of address lines to a plurality of hardware element banks of a vector register file using a plurality of address line selectors, wherein:
each set of address lines of the plurality of sets of address lines includes:
a first address line configured to receive a first address, and
a second address line configured to receive a second address,
each address line selector of the plurality of address line selectors is coupled to a corresponding set of address lines of the plurality of sets of address lines and is configured to generate an output by selecting the first address line or the second address line of the set of address lines coupled to the address line selector,
the first address line of a first set of address lines of the plurality of sets of address lines and the second address line of the first set of address lines are selectively coupled to a first hardware element bank of the plurality of hardware element banks, and
the vector register file is coupled to a single write port;
coupling the first address line of the first set of address lines to the first hardware element bank according to a particular selection pattern;
selectively addressing the first hardware element bank using the first address line of the first set of address lines; and
storing data within the first hardware element bank via the single write port.

22. The method of claim 21, further comprising:
coupling the first address line of a second set of address lines of the plurality of sets of address lines to a second hardware element bank of the plurality of hardware element banks according to the particular selection pattern, wherein the first hardware element bank and the second hardware element bank are coupled to a common address line.

23. The method of claim 21, further comprising:
coupling the second address line of a second set of address lines of the plurality of sets of address lines to a second hardware element bank of the plurality of hardware element banks according to the particular selection pattern, wherein the first hardware element bank and the second hardware element bank are coupled to different address lines.

24. An apparatus comprising:
means for storing vector data, the means for storing vector data coupled to a single write port and including a plurality of hardware element banks;
means for selectively coupling address lines of a plurality of sets of address lines to the plurality of hardware element banks, each set of address lines of the plurality of sets of address lines including a first address line configured to receive a first address and a second address line configured to receive a second address, the means for selectively coupling including:
a plurality of address line selectors, wherein each address line selector of the plurality of address line selectors is coupled to a corresponding set of address lines of the plurality of sets of address lines and is configured to generate an output by selecting the first address line or the second address line of the set of address lines coupled to the address line selector; and means for writing, via the single write port, data within the plurality of hardware element banks, wherein each hardware element bank of the plurality of hardware element banks is configured to be selectively addressed by one of the first address or the second address, wherein a first hardware element bank of the plurality of hardware element banks is configured to be selectively coupled, via a first output of a first address line selector, to the first address line of a first set of address lines of the plurality of sets of address lines, the first set of address lines coupled to the first address line selector, and wherein a second hardware element bank of the plurality of hardware element banks is configured to be selectively coupled, via a second output of a second address line selector, to the second address line of a second set of address lines of the plurality of sets of address lines, the second set of address lines coupled to the second address line selector.

25. The apparatus of claim 24, wherein the means for selectively coupling is responsive to a selection pattern.

26. A non-transitory computer readable storage medium comprising processor-executable instructions that, when executed by a processor, cause the processor to:

generate a selection pattern to selectively couple address lines of a plurality of sets of address lines to a plurality of hardware element banks of a vector register file using a plurality of address line selectors, wherein:

each set of address lines of the plurality of sets of address lines includes:

a first address line configured to receive a first address, and a second address line configured to receive a second address, each address line selector of the plurality of address line selectors is coupled to a corresponding set of address lines of the plurality of sets of address lines and is configured to generate an output by selecting the first address line or the second address line of the set of address lines coupled to the address line selector, and the vector register file is coupled to a single write port; and store data within the plurality of hardware element banks, wherein:

each hardware element bank of the plurality of hardware element banks is configured to be selectively addressed by one of the first address or the second address via the single write port, a first hardware element bank of the plurality of hardware element banks is configured to be selectively coupled, via a first output of a first address line selector, to the first address line of a first set of address lines of the plurality of sets of address lines, the first set of address lines coupled to the first address line selector, and a second hardware element bank of the plurality of hardware element banks is configured to be selectively coupled, via a second output of a second address line selector, to the second address line of a second set of address lines of the plurality of sets of address lines, the second set of address lines coupled to the second address line selector.

27. The non-transitory computer readable storage medium of claim 26, wherein particular first address lines of the plurality of sets of address lines and particular second address lines of the plurality of sets of address lines are configured to be selectively coupled to the plurality of hardware element banks through respective multiplexers of a plurality of multiplexers.

28. The apparatus of claim 1, wherein all of the hardware element banks of the plurality of hardware element banks are configured to be selectively addressed according to a selection pattern.

29. The apparatus of claim 1, wherein the plurality of address line selectors comprises a plurality of multiplexers, wherein each multiplexer of the plurality of multiplexers is configured to selectively couple a set of address lines of the plurality of sets of address lines to a respective hardware element bank of the plurality of hardware element banks, and wherein all of the hardware element banks of the plurality of hardware element banks are selectively addressed, via the plurality of multiplexers, based on a selection pattern.

30. The apparatus of claim 1, wherein the first address line selector comprises a first multiplexer, and wherein inputs of the first multiplexer are coupled to corresponding address lines of the first set of address lines.

31. The method of claim 8, further comprising selectively addressing all of the hardware element banks of the plurality of hardware element banks according to the particular selection pattern.

32. The apparatus of claim 15, wherein all of the hardware element banks of the plurality of hardware element banks are configured to be selectively addressed according to a selection pattern.

33. The method of claim 21, further comprising selectively addressing all of the hardware element banks of the plurality of hardware element banks according to the particular selection pattern.

* * * * *